Patented Dec. 31, 1940

2,226,635

UNITED STATES PATENT OFFICE 2,226,635

PRODUCTION OF LOWER ALKYLAMINES

Horace Finningley Oxley and Edward Boaden Thomas, Spondon, near Derby, England, assignors to Celanese Corporation of America, a corporation of Delaware No Drawing. Application September 7, 1938, Serial No. 228,794. In Great Britain September 23, 1937

6 Claims. (Cl. 260—585)

This invention relates to the production of organic compounds and is more particularly concerned with the production of ethylamine and other amines.

According to the invention an amine is produced by subjecting the corresponding organic hydroxy-compound to reaction with an ammonium salt in aqueous solution, for instance ethylamine is produced by reacting ethyl alcohol with an aqueous solution of an ammonium salt, e. g. ammonium chloride.

The manufacture of ethylamine is a particularly important embodiment of the present invention and it has been found possible to produce by the process of the invention the mono-ethylamine to the substantial exclusion of the di- or tri-ethylamines, for instance to obtain a product consisting of mono-ethylamine containing as little as 5% or less of di-ethylamine and free from tri-ethylamine. With this object in view it has been found desirable to employ an excess of the ammonium salt and in particular more than twice as much of the ammonium salt as is theoretically required to produce the mono-amine and preferably to employ much more than this, for instance 8 or more times the quantity theoretically required.

The ammonium salt employed in the process of the invention may be a salt of an inorganic acid or an organic acid, ammonium chloride and ammonium acetate being salts which have been found to be especially suitable. With regard to the concentration of the ammonium salt solution employed, it is usually convenient to choose a concentration which will yield a reaction product which is sufficiently fluid to offer no difficulty in removal from the reaction vessel. In general the concentration will be less than 70%, for instance 20 to 70%, the lower part of this range, e. g. 20 to 35%, being especially suitable where a continuous mode of operation is adopted. It is not necessary that the whole of the ammonium salt should be in solution when it is introduced into the reaction vessel, and with quantities of the ammonium salt corresponding to the higher concentrations (say 50 to 70% with ammonium chloride) there will be introduced into the reaction vessel a fluid mixture of solid salt and its saturated solution.

The reaction is carried out under super-atmospheric pressure, for instance pressures exceeding 50 atmospheres, pressures of the order of 100–150 atmospheres or even higher, e. g. up to 250 atmospheres, being very suitable. The reaction temperatures may be varied somewhat according to the particular starting materials employed but in general temperatures of 250°–350° C. are suitable. Any tendency for the alcohol to be decomposed to give unwanted by-products, for instance a tendency in the case of ethyl alcohol to decompose to give ethylene, can be suppressed by avoiding the presence of a large gas space in the reaction vessel and/or by filling the available gas space with the gas which would normally be produced by the undesired decomposition, i. e. with ethylene in the case of ethyl alcohol. When the reaction is carried out in an atmosphere of ethylene or other olefine, the olefine undergoes reaction with the ammonium salt and an additional quantity of the amine is produced in this way.

The reaction is one which can be carried out continuously or as a batch process. The autoclave or other apparatus in which the reaction takes place should be made of a corrosion-resistant steel, for instance that sold under the registered trade-mark Staybrite, particularly when the ammonium salt employed is ammonium chloride.

As previously indicated it is desirable to employ a large excess of the ammonium salt and it is possible by so doing, for instance by using about 8 times the theoretical quantity of ammonium salt, to use up nearly all of the alcohol present by heating the reactants in a batch process for a period of about 5–6 hours or even less. A longer heating time may however be employed, e. g. up to 8 or 9 or more hours, and may even be desirable when a smaller excess of the ammonium salt is present. Similarly, the employment of a high proportion of the ammonium salt enables a large part, e. g. three-quarters or more, of the alcohol introduced in a continuous process to be converted.

The following examples illustrate the invention as applied to the manufacture of monoethylamine:—

Example 1

Industrial ethyl alcohol, ammonium chloride and water are mixed in the molecular proportions of 1:8:32 and the mixture is fed into an autoclave of stainless steel. The quantity of the mixture employed is equal to more than 75%, and preferably about 90%, of the capacity of the autoclave and the remaining small gas-space is charged with ethylene under a pressure of about 30 atmospheres.

The autoclave is closed and heated to about 350° C. under a pressure of 150–170 atmospheres, the pressure being regulated by means of a high-pressure release valve. After about 6 hours the autoclave is allowed to cool and the pressure of ethylene gas released. The product is then worked up by evaporating the liquor, crystallising the bulk of the ammonium chloride and treating the filtrate with lime to liberate the ethylamines.

80–90% of the alcohol introduced is converted into monoethylamine while a small quantity of diethylamine, corresponding to somewhat less than 5% of the alcohol introduced, is also formed.

*Example 2*

A reaction mixture is prepared by mixing industrial ethyl alcohol with a 25% solution of ammonium chloride in such proportions that the molecular ratio of ethyl alcohol to ammonium chloride is approximately 1:8.

The solution is conveyed by means of a high pressure pump from a reservoir, stainless steel lined, into an autoclave of stainless steel heated to 310–320° C., a pressure of 120–130 atmospheres being maintained within the autoclave. The autoclave is provided with inlet and outlet tubes and also with a baffle, to prevent the reagents passing directly from inlet to outlet and to cause them instead to follow a circuitous path through the autoclave. The reaction products are allowed to flow continuously from the outlet tube through stainless steel condensers past a high pressure valve. With an autoclave of 9.5 litres capacity the reaction mixture is fed at the rate of 0.5–1.0 kg. per hour.

The product is worked up as in the preceding example and it is found that from 70–80% of the ethyl alcohol is converted into monoethylamine, while an additional 2–5% is converted into diethylamine.

While the invention has been described more particularly with reference to the production of ethylamine, the invention is not limited in this respect and may be applied to the production of other amines from the corresponding hydroxy-compound. For instance, by subjecting methyl alcohol to reaction with an ammonium salt methylamine may be produced in good yield and likewise higher amines such as propylamine and butylamine may be produced from the corresponding alcohols. The process may be also applied to the production of aromatic amines by subjecting phenols to reaction with aqueous solutions of ammonium salts. In all cases the use of a large excess of the ammonium salt in aqueous solution over that theoretically required to produce the mono-amine favours the production of the mono-amine as opposed to the di- and tri-amines.

Having described our invention what we desire to secure by Letters Patent is:

1. Process for the manufacture of a lower alkyl mono-amine substantially free from the corresponding di- and tri-amines, which comprises heating together to a temperature above 250° C. one molecular proportion of a lower alkyl alcohol and at least eight molecular proportions of an ammonium salt in aqueous solution.

2. Process for the manufacture of monoethylamine substantially free from di- and tri-ethylamine, which comprises heating together to a temperature above 250° C. one molecular proportion of ethyl alcohol and at least eight molecular proportions of an ammonium salt in aqueous solution.

3. Process for the manufacture of a lower alkyl mono-amine substantially free from the corresponding di- and tri-amines, which comprises heating together to a temperature above 250° C. one molecular proportion of a lower alkyl alcohol and at least eight molecular proportions of ammonium chloride in aqueous solution.

4. Process for the manufacture of monoethylamine substantially free from di- and tri-ethylamine, which comprises heating together to a temperature above 250° C. one molecular proportion of ethyl alcohol and at least eight molecular proportions of ammonium chloride in aqueous solution.

5. Process for the manufacture of a lower alkyl mono-amine substantially free from the corresponding di- and tri-amines, which comprises heating together to a temperature above 250° C. one molecular proportion of a lower alkyl alcohol and at least eight molecular proportions of an ammonium salt in aqueous solution under an atmosphere consisting essentially of the olefine corresponding to the said lower aliphatic alcohol.

6. Process for the manufacture of monoethylamine substantially free from di- and tri-ethylamine, which comprises heating together to a temperature above 250° C. one molecular proportion of ethyl alcohol and at least eight molecular proportions of an ammonium salt in aqueous solution under an atmosphere consisting essentially of ethylene.

HORACE FINNINGLEY OXLEY.
EDWARD BOADEN THOMAS.